United States Patent [19]
Matsuo et al.

[11] 3,947,428
[45] Mar. 30, 1976

[54] ANIONIC PROCESS FOR THE POLYMERIZATION OF LACTAM

[75] Inventors: Tadao Matsuo; Shuji Mori; Yoshiki Morimoto, all of Kobe, Japan

[73] Assignee: Mitsuboshi Belting Ltd., Kobe, Japan

[22] Filed: June 17, 1974

[21] Appl. No.: 480,074

Related U.S. Application Data

[63] Continuation-in-part of Ser. No. 262,847, June 14, 1972, abandoned.

[30] Foreign Application Priority Data
June 14, 1971 Japan.................................. 46-42377

[52] U.S. Cl............................. 260/78 L; 260/78 P
[51] Int. Cl.²......................................... C08G 69/20
[58] Field of Search........................ 260/78 L, 78 P

[56] References Cited
UNITED STATES PATENTS
3,086,962  4/1963  Mottus et al...................... 260/78 L Primary Examiner—Lucille M. Phynes
Attorney, Agent, or Firm—Sughrue, Rothwell, Mion, Zinn & Macpeak

[57] ABSTRACT

A polymer of ω-lactam is prepared by heating a mixture of at least one kind of ω-lactam, an anionic catalyst comprising the reaction product of a strong base and a ω-lactam, and an N-substituted ethyleneimine derivative represented by the general formula

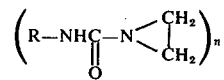

wherein R represents an organic group as hereafter defined, and $n$ is 2 or 3.

29 Claims, No Drawings

ANIONIC PROCESS FOR THE POLYMERIZATION OF LACTAM

RELATED APPLICATION

This is a continuation-in-part application of U.S. Ser. No. 262,847, filed June 14, 1972 now abandoned.

BACKGROUND OF THE INVENTION

1. Field of the Invention

The present invention relates generally to an anionic polymerization process of ω-lactum and, more particularly, it relates to an anionic polymerization process of ω-lactum using as a promotor an N-substituted ethyleneimine derivative having the general formula

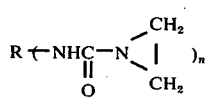

wherein R represents an organic group as hereafter defined, and n is 2 or 3.

2. Description of the Prior Art

As a polymerization process for lactam, a process in which a lactam is polymerized by heating it to a high temperature for a along period of time in the presence of water, a mineral acid, a fatty acid, or an amine is well-known. Furthermore, an anionic polymerization process wherein a strong basic material is employed as the catalyst is also well-known.

It is known that alkali metals; alkaline earth metals; the hydroxides, hydrides, carbonates, or organic compounds of those metals; organoaluminum compounds such as triethylaluminum and lithium aluminum hydride; and organomagnesium compounds such as a Grignard reagent; are effective as the catalyst for the aforesaid anionic polymerization.

However, in the case of using the above-described catalyst individually in the ring-opening polymerization of lactam as described above, it is required in polymerizing the lactam to heat the reaction system to high temperatures above 200°C for a few hours and also it is further required in obtaining the polymer of lactam having a higher polymerization degree with a higher polymerization yield to heat the reaction system to a higher temperature for a longer period of time than above.

It is, however, possible to obtain a polymer or a polyamide having a higher polymerization degree with a higher polymerization yield at low temperatures below 200°C in quite a short period of time by using a proper polymerization promotor together with the catalyst and thus it is quite effective for the anionic polymerization of lactam to use the promotor together with the catalyst as described above.

As such a promotor, acyl chlorides, acyl anhydrides, acylimides, carbodiimides, organic isocyanates, and other various acylating agents and acyl compounds are well-known. However, these known promotors tend to be deteriorated by moisture in the air to lose their activity and thus these compounds must be handled carefully. Moreover, the use of isocyanate compounds requires various precautions due to the toxicity thereof. Also, an acid chloride tends to react with water to form hydrochloric acid and an organic acid, which results in reducing the activity of the acid chloride as a promotor as well as adversely influences the polymerization of lactam.

Furthermore, when a lactam is polymerized using such a known promotor, a polymer having an undesirable color is frequently produced, for example, when an organic carboxylic acid anhydride is used as the promotor in the polymerization of lactam, only dark brown polymers are obtained.

SUMMARY OF THE INVENTION

As the results of the inventors' investigations on promotors having an activity at least equal to the aforesaid known promotors but not having the disadvantages described above, it has been discovered that an N-substituted ethyleneimine derivative having the general formula shown below possesses excellent activity as a promotor and is unaccompanied by the aforesaid disadvantages.

Thus, the lactam polymerization process of this invention comprises heating a mixture of at least one kind of ω-lactam, an anionic catalyst comprising a reaction product of a strong base and a ω-lactam, and as a promotor, an N-substituted ethyleneimine derivative having the general formula

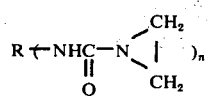

wherein R represents an organic group as hereinafter defined, and n is 2 or 3. According to the process of this invention, a ω-lactam can be polymerized very quickly at low temperatures below 200°C.

DETAILED DESCRIPTION OF THE INVENTION

The term organic group is intended to encompass divalent and trivalent organic groups, providing N-substituted ethyleneimine derivatives wherein n is 2 and 3, respectively, in the above formula, e.g., a nuclear substituted or unsubstituted aromatic hydrocarbon group(s) or a group having an aromatic hydrocarbon group(s) interrupted by a heteroatom or a heteroatomic group (examples of suitable nuclear substituents are an alkyl group or an alkoxy group having from 1 to 20 carbon atoms), an alkylene group having from 1 to 20 carbon atoms such as an ethylene group, a tetramethylene group, a heptamethylene group, and a hexamethylene group, a

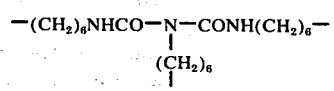

group, and a

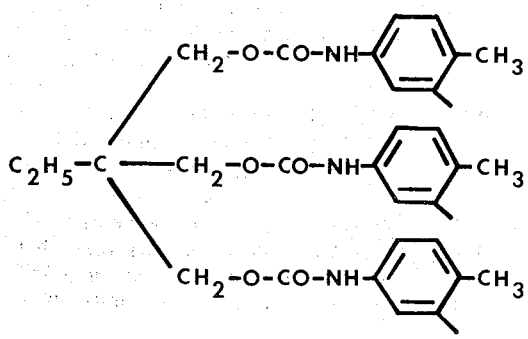

group. Examples of the aromatic hydrocarbon group include arylene groups such as a phenylene group, a diphenylene group, a tolylene group, a xylyene group, a naphthylene group, and the halogen (e.g., chlorine, bromine and iodine) substituted derivatives thereof, such as chloro-m-phenylene group, a activity higher than the hydrogen of >N—H of the lactam to be polymerized.

The strong basic materials as a raw material for preparing the anionic catalysts used in this invention may include any materials used conventionally for the preparation of the anionic polymerization catalysts of lactams.

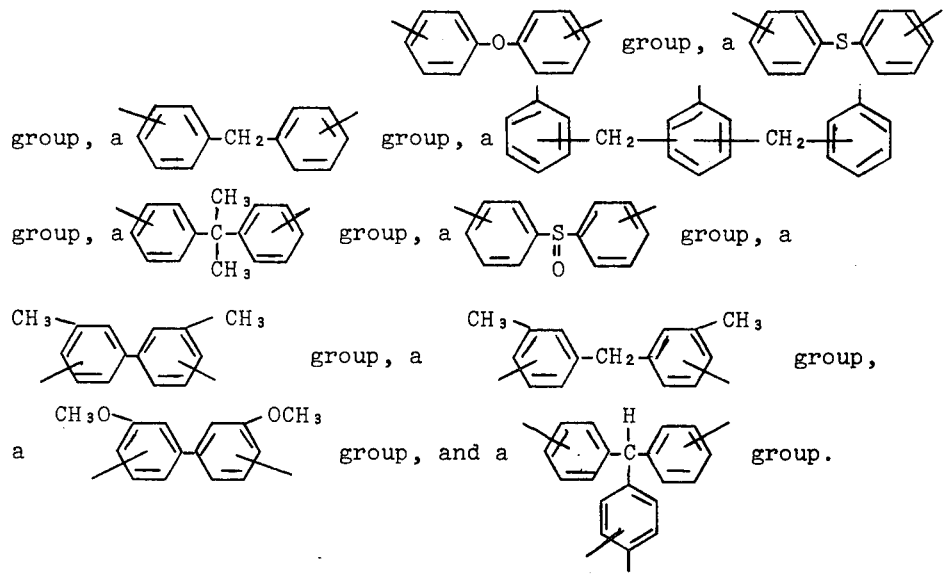

Preferred examples of the N-substituted ethyleneimine derivatives used in this invention are
Diphenylmethane-4,4'-bis-ethylene Urea,
Diphenylethane-4,4'-bis-ethylene Urea,
N,N'-Hexamethylene-bis-ethylene Urea,
m-Tolylene-bis-ethylene Urea,
p(m)-Phenylene-bis-ethylene Urea,
Diphenyl-4,4'-bis-ethylene Urea,
3,3'-Dimethoxydiphenyl-4,4'-bis-ethylene Urea,
3,3'-Dimethyldiphenyl-4,4'-bis-ethylene Urea,
m(p)-Xylylene-bis-ethylene Urea
1-Chloro-m-phenylene-bis-ethylene Urea,
3,3'-Dimethyldiphenylmethane-4,4'-bis-ethylene Urea,
N,N'-Tetramethylene-bis-ethylene Urea,
N,N'-Pentamethylene-bis-ethylene Urea,
N,N'-Heptamethylene-bis-ethylene Urea, and
N,N'-Octamethylene-bis-ethylene Urea.

In describing the groups suitable for the organic group R, the meaning of the term "a group not obstructing the polymerization of ω-lactam" will be explained below. In general, the promotor for an anionic polymerization of a lactam combines with the lactam to be polymerized to form, first, an N-substituted lactam and by the activation action of the N-substituted lactam, the polymerization of the lactam is promoted. However, when the N-substituted lactam contains therein an active hydrogen having a higher activity than that of the hydrogen of the >N—H of the lactam to be polymerized, the presence of such an N-substituted lactam on the contrary obstructs the polymerization of the lactam. Accordingly, the term "a group not obstructing the polymerization of ω-lactam" is intended to mean a group having no active hydrogen with an As the examples of the strong-basic materials, there are alkali metals; alkaline earth metals; the strong-basic derivatives of those metals such as hydroxides, hydrides, and carbonates of the aforesaid metals; fluorohydrides; and organometal compounds such as alkylmetal compounds, amidometal compounds, and Grignard reagents. Typical examples of materials used as strong bases for preparing the anionic catalysts include lithium, sodium, potassium, calcium, barium, lithium hydride, sodium hydride, sodium methoxide, sodium ethoxide, sodium phenoxide, naphthylsodium, sodium amide, diethylzinc, triethylaluminum, sodium hydroxide, potassium hydroxide, lithium hydroxide, magnesium hydroxide, potassium hydroxide, strontium hydroxide, sodium aluminate, and the like.

The anionic catalyst used in the process of this invention is prepared by the reaction of the aforesaid strong-basic material and a ω-lactam. The ω-lactam used for the preparation of the anionic catalyst in this invention is generally the same lactam as the lactam to be polymerized in the process of this invention but this is not always a necessary factor in this invention, that is, it is possible in this invention to prepare the anionic catalyst from a ω-lactam having 3 to 12 carbon atoms andd use the anionic catalyst thus prepared for the polymerization of another ω-lactam having 3 to 12 carbon atoms.

The anionic catalyst is prepared by heating a lactam and the strong base as described above to temperatures of about 25° to 200°C for several minutes. As the case may be, the strong base may be added to the entire amount of the ω-lactam to be polymerized or preferably added to a part of the ω-lactam to be polymerized to provide a dense solution of the anionic catalyst. In this case the lactam solution containing the anionic catalyst may be added to a large amount of the lactam containing the aforesaid promotor.

It is preferable that the lactam to be used for the preparation of the anionic catalyst be substantially anhydrous and also the strong base to be added to the lactam for the preparation of the anionic catalyst be anhydrous. The content of the base to be used is generally in the range of about 0.05 mol percent to about 10 mol percent to the amount of the lactam to be polymerized. However, if the concentration of the strong base is high, a polyamide having a low molecular weight is formed and thus for most purposes the optimum content of the strong base is preferably in the range of from 0.1 to 2 mol percent.

It is desirable to remove the volatile materials from the mixture of the strong base and the lactam and at the same time to prevent the lactam from being oxidized by passing nitrogen or another inert gas through the molten lactam at the beginning of the reaction of the strong base and the lactam. Alternatively, the reaction of the strong base and the lactam may be conducted under a reduced pressure, whereby the volatile matter is distilled away together with a part of the lactam.

The ω-lactam used in this invention is generally one having 3 to 12 carbon atoms in the ring. Examples of such ω-lactams are pyrrolidone, piperidone, ε-caprolactam, ω-enantholactam, ω-capryliclactam, ω-lauryllactam, ω-pelargonolactam, ω-decanolactam, and ω-undecanolactam.

In general, the anionic polymerization reaction of this invention may be carried out at temperatures higher than the melting point of the lactam as a monomer and lower than the melting point of the polyamide prepared. The reaction temperature depends upon the specific lactam to be employed but in general the temperature is in the range of about 25°C to about 200°C. Furthermore, when the lactam has less than 6 carbon atoms, it is preferable to conduct the polymerization at temperatures lower than 150°C.

According to the process of this invention, ε-caprolactam is easily polymerized at temperatures of about 100° to 200°C, preferably at 120° to 140°C. The preferred polymerization temperatures for lauryllactam range from about 153°C to about 180°C. In the case of the copolymerization of ε-caprolactam and lauryl-lactam, the copolymerization temperature depends upon the copolymerization ratio of the two monomers but the optimum copolymerization temperature generally ranges from about 120°C to 180°C. Pyrrolidone or piperidone is polymerized generally at about 20° to 80°C, preferably at about 30° to 60°C. Furthermore, ω-enatholactam, ω-capryliclactam, ω-pelargonolactam, ω-decanolactam, or ω-undecanolactam is polymerized generally at temperatures ranging from the melting point of the corresponding lactam to 200°C, preferably at 160° to 180°C. The reaction period of time for the polymerization depends, of course, on the nature of the lactam to be polymerized and the reaction temperatures but is generally in the range of from 0.5 to 200 minutes.

The amount of the N-substituted ethyleneimine derivative used in this polymerization process of this invention as the promotor generally is ordinarily about 0.01 to about 5 mol percent to the amount of the lactam to be polymerized but the use of a large amount of the promotor is undesirable from the standpoint of the molecular weight and the properties of the polymer obtained and thus it is usually preferable to use the promotor in an amount of less than half the amount of the basic catalyst on a mol percent basis. Accordingly, it is more preferred to use the promotor in an amount of about 0.05 to about 1.0 mol percent to the amount of the lactam to be polymerized.

As described above, the promotor may be added to the lactam containing the strong-basic catalyst prepared by the reaction of the lactam and the strong base. Alternatively, the promotor may be dissolved in another lactam and the solution may be mixed with the lactam containing the strong-basic catalyst on polymerization.

The N-substituted ethyleneimine derivative which is a novel promotor used in the process of this invention has various advantages in comparison with conventional promotors. That is, as described before, known promotors such as isocyanate compounds, acid chlorides, acid anhydrides, carbodiimide, etc., tend to chemically react with moisture in the air to lose their activity and thus they must be handled with care. On the other hand, the N-substituted ethyleneimine derivative used in the process of this invention has the advantages that it is stable not only to moisture in air but also to water and further the toxicity of the N-substituted ethyleneimine derivative to the human body is quite low in comparison with that of the aforesaid known promotors. Moreover, the promotor of this invention does not tend to color the polymer produced to the extent of prior art promotors. Furthermore, the activity of the promotor is markedly higher than that of the conventional promotors and hence the polymerization of the lactam can be conducted rapidly at a comparatively low temperature by employing the promotor of this invention.

The process of this invention can give rise, in particular, to various advantages when the process is applied as it is to the production of moldings in a metallic mold. For example, when the conventional high-temperature basic polymerization process for a lactam is applied to a pour molding, the mold must be cooled sufficiently until the molten or semi-molten mold article is solidified so that it can be withdrawn safely therefrom. Therefore, a long period of time is required to finish the pour molding, which results in an economically disadvantageous molding procedure. On the other hand, because the feeding temperature and the temperature of the metallic mold in the polymerization are low in the process of this invention, the voids caused by the shrinking of the mold article hardly form and thus a mold article having no defects therein can be obtained by employing the process of this invention. That is, according to the process of this invention, even a large polyamide molded article can be produced economically and quickly in a metallic mold and furthermore the article thus obtained is composed of a polyamide having a high molecular weight and has a high toughness.

The process of this invention will be illustrated in greater detail by reference to the following examples but these examples are included merely for the purpose of illustration and are not intended to limit the scope of this invention.

EXAMPLE 1

2.66 mols of anhydrous ε-caprolactam was melted by heating in a dry nitrogen atmosphere and while maintaining the molten lactam at 130°C. Sodium hydride (50%, oily) was added thereto with stirring in the amount shown in Table 1 and dissolved therein completely. On the other hand, 95.4g of diphenylmethane-4,4'-bis-ethylene urea was dissolved in 320g of ε-caprolactam melted at 100°C to provide a 10 mol% solution thereof and the solution was added to the lactam containing the strong base prepared above followed by stirring so that the concentration of the promotor as shown in Table 1 was obtained. Then, the vessel was closed and the mixture was heated to 180°C in an oven, whereby the lactam solution lost its fluidity within about 30 minutes. By heating the mixture in the vessel to 180°C for an additional 30 minutes in the oven a substantially white beautiful solid polymer was obtained. About 10g of the polymer thus obtained was cut into pellets of 5 mm in diameter using a saw and pellets of the polymer were heated in hot water of 90°C to 100° for 6 hours and then dried. From the weight loss of the sample, the amount of soluble components in the hot water was calculated. Furthermore, a 0.250g slice of the polymer was dissolved in 25.0 ml of concentrated sulfuric acid having a concentration of above 97% and the relatively viscosity thereof at 25.0°C was measured by using an Ostwald viscometer. The results obtained are shown in the following table.

TABLE 1

(Example of the polymerization of ε-caprolactam when diphenyl-methane-4,4'-bis-ethylene urea was used as the promoter.)

| Sample No. | (A) (mol%) | (B) (mol%) | (C) (°C) | (D) (min) | (E) | (F) (%) |
|---|---|---|---|---|---|---|
| 1 | 0.2 | 0.1 | 130 | <30 | 8.05 | 0.37 |
| 2 | " | 0.2 | " | " | 8.10 | 0.10 |
| 3 | " | 0.3 | " | " | 4.75 | 0.50 |
| 4 | " | 0.4 | " | " | 3.98 | 0.47 |
| 5 | 0.2 | 0.5 | " | " | 4.23 | 0.51 |
| 6 | 0.5 | 0.1 | " | " | 5.01 | 0.68 |
| 7-a | " | 0.2 | 130 | " | 6.69 | 0.12 |
| 7-b | " | " | 160 | < 5 | 8.94 | 2.51 |
| 8 | " | 0.3 | 130 | <30 | 4.20 | 0.20 |
| 9 | " | 0.4 | " | " | 3.50 | 0.41 |
| 10-a | " | 0.5 | 130 | " | 3.76 | 0.49 |
| 10-b | " | " | 160 | <15 | 3.19 | 0.78 |

NOTE:
(A) Sodium hydride (50%),
(B) Diphenylmethane-4,4'-bis-ethylene-urea,
(C) Initial polymerization temperature,
(D) Period of time for loss of the fluidity of the reaction system,
(E) Relative viscosity, and
(F) Components soluble in hot water.

In addition, the ε-caprolactam content was 2.66 mols, the temperature in the oven was 180°C and the heating time was 60 minutes throughout all of the experiments shown in the above table.

Furthermore, when no promotor of this invention was employed in Sample Nos. 1 – 10, the lactam solution did not become viscous after 60 minutes even though 0.5 mol% of sodium hydride was used.

The structural formula of diphenylmethane-4,4'-bis-ethylene urea is as follows.

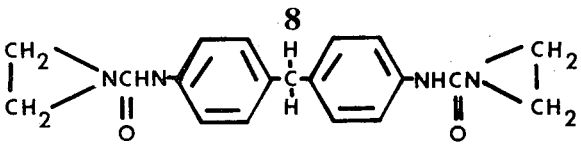

EXAMPLE 2

In this example, lithium hydride was used as the catalyst. After dissolving 0.2 mol% of lithium hydride in a melt of 2.66 mols of anhydrous ε-caprolactam at 150°C, the lactam solution was cooled to 130°C and 0.1 mol% of diphenylmethane-4,4'-bis-ethylene urea was added to the solution followed by polymerization in an oven at 175°C. After 100 minutes an opaque solid polymer having an extremely slight yellow color was obtained. The relative viscosity of the polymer was 3.18 and the content of the hot water soluble components was 9.35%.

Also, when the same procedure as above was followed using 0.5 mol% of the promotor, the relative viscosity of the polymer obtained was 2.55 and the content of the hot-water soluble components was 1.35%.

EXAMPLE 3

In this example, ω-lauryllactam was polymerized using diphenylmethane-4,4'-bis-ethylene urea as the promotor.

After melting 1.52 mols of ω-lauryllactam at 182°C, .02 mol% of sodium hydride and 0.1 mol% of diphenylmethane-4,4'-bis-ethylene urea were added to the melt and then the polymerization of the lactam was conducted at 180°C in an oven, whereby the lactam solution lost its fluidity after about 10 minutes. When the reaction product was heated at 180°C in the oven for an additional 15 minutes and then allowed to cool, an opaque solid polymer having an extremely slight yellow color was obtained. The relative viscosity of the polymer was 2.19 and the content of the hot water soluble components was 2.92%.

EXAMPLE 4

In these examples the copolymerization of ε-caprolactam and ω-lauryllactam was illustrated.

That is, ε-caprolactam was mixed with ω-lauryllactam in a nitrogen atmosphere in the mol ratio as shown in Table 2 and the mixture was melted by heating. While maintaining the molten mixture at the temperature as shown in Table 2, 0.2 mol% of sodium hydride (50%, oily) was dissolved therein and then the promotor was added to the mixture followed by stirring. The vessel containing the reaction mixture was closed and the mixture was heated to 180°C in an oven.

In Example 4 in which diphenylmethane-4,4'-bis-ethylene urea was used as the promotor, the reaction system lost its fluidity within 60 minutes and when the reaction product was allowed to cool, an opaque solid polymer having an extremely slight yellow color was obtained.

The polymerization conditions, the properties of the polymers obtained, etc., are shown in Table 2.

TABLE 2

(Example of copolymerization of ε-caprolactam and ω-lauryllactam)

| Example No. | (A) (mol) | (B) (mol) | (C) (mol%) | (D) (mol%) | (E) (°C) | (F) (°C) | (G) (min) | (H) (min) | (I) | (J) (%) |
|---|---|---|---|---|---|---|---|---|---|---|
| 4-1 | 2.83 | 0.41 | 0.2 | 0.1 | 128 | 180 | 60 | <60 | 2.68 | 39.2 |

TABLE 2-continued (Example of copolymerization of ε-caprolactam and ω-lauryllactam)

| Example No. | (A) (mol) | (B) (mol) | (C) (mol%) | (D) (mol%) | (E) (°C) | (F) (°C) | (G) (min) | (H) (min) | (I) | (J) (%) |
|---|---|---|---|---|---|---|---|---|---|---|
| 4-2 | 1.42 | 1.22 | 0.2 | 0.1 | 154 | 180 | 60 | <60 | 1.51 | 28.0 |

NOTE:
(A) ε-caprolactam,
(B) ω-lauryllactam,
(C) Sodium hydride,
(D) Diphenylmethane-4,4'-bis-ethylene urea,
(E) Initial polymerization temperature,
(F) Temperature in oven,
(G) Heating time,
(H) Period of time for the reaction system to lose its fluidity,
(I) Relative viscosity, and
(J) Hot water soluble components.

EXAMPLE 5

After melting 2.66 mols of ε-caprolactam at 128°C, 0.4 mol% of sodium hydride and 0.5 mol% of N,N'-hexamethylene-bis-ethylene urea were added to the melt and the mixture was heated to 186°C in an oven, whereby the reaction system lost its fluidity after 30 minutes. After 60 minutes, a white turbidity was observed near the wall of the reaction vessel.

The polymer thus formed was allowed to cool and the relative viscosity of the polymer and the content of the hot water soluble components of the polymer were measured in the same manner as described in Example 1. The relative viscosity was 2.95 and the content of the hot water soluble components was 4.48%.

Also, the same procedure as described above was followed except that ε-caprolactam was melted at 125.5°C, 0.2 mol% of N,N'-hexamethylene-bis-ethylene urea was used, and the temperature in the oven was 185°C, whereby the reaction system lost its fluidity after 30 minutes and after 90 minutes a white turbidity was observed near the wall of the reaction vessel.

The polymer was allowed to cool and the content of the hot water soluble components of the polymer measured in the same manner as described above was 0.13%.

The structural formula of N,N'-hexamethylene-bis-ethylene urea is as follows.

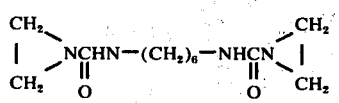

EXAMPLE 6

In 180g of acetone was dissolved 34.4g of 2,4-tolylene diisocyanate and while stirring the solution at 5° – 10°C, 76g of an acetone solution containing 18.1g of ethyleneimine was added dropwise to the solution over a period of 60 minutes, whereby white precipitates were formed after about 30 minutes. After conducting the reaction for 60 minutes additionally, the product was filtered, washed with a small amount of acetone, and dried at normal temperatures to provide 43.5g of m-tolylene-bis-ethylene urea.

After melting 2.66 mols of ε-caprolactam at 127°C, 0.5 mol% of sodium hydride (oily, 50%) was added to the melt and dissolved therein. Then, 0.2 mol% of the m-tolylene-bis-ethylene urea prepared above was added to the melt and the mixture was heated to 185°C in an oven, whereby the reaction system lost its fluidity after 30 minutes. When the reaction system was heated further for 60 minutes to 185°C in the oven and then allowed to cool, an opaque white polymer was obtained.

The relative viscosity of the polymer and the content of the hot water soluble components of the polymer measured in the same manner as described in Example 1 were 3.04 and 0.1%, respectively.

The melting point of the polymer measured using differential thermal analysis was 221°C.

The structural formula of m-tolylene-bis-ethylene urea is as follows.

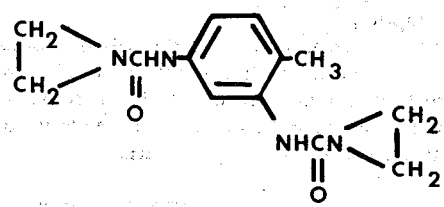

EXAMPLE 7

After melting 300g of ε-caprolactam at 125°C, sodium hydride (50%, oily) was added thereto in an amount of 0.5 mol% to the lactam and dissolved therein followed by reaction. Then, 0.2 mol% of 3,3'-dimethyl-diphenyl-4,4'-bis-ethylene urea was added to the reaction mixture, whereby the mixture gelled after 45 minutes. By continuing the reaction for an additional 180 minutes under heating and allowing the reaction product to cool, a white polymer was obtained. The relative viscosity of the polymer and the content of the hot water soluble components of the polymer were 4.4 and 21.9%, respectively.

The structural formula of 3,3'-dimethyl-diphenyl-4,4'-bis-ethylene urea is as follows.

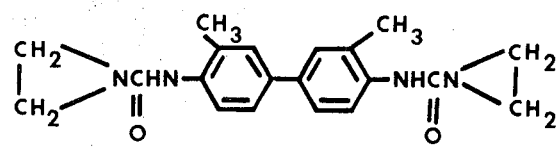

EXAMPLE 8

The same procedure as described in Example 7 was followed except that 0.2 mol% of N,N'-xylylene-bis-ethylene urea (a mixture of m-xylylene and p-xylylene of 70-75/30-25 by weight ratio) was used in place of 3,3'-dimethyldiphenyl-4,4'-bis-ethylene urea. After 100 minutes the lactam liquid gelled and then by continuing the reaction additionally for 180 minutes under heating and allowing the reaction product to cool, a white polymer was obtained. The relative viscosity of the polymer and the content of the hot water soluble components of the polymer were 3.4 and 10.5%, respectively.

The structural formula of N,N'-xylylene-bis-ethylene urea is as follows.

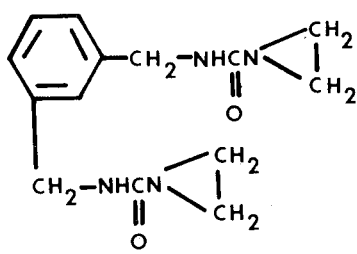

(meta compound) and

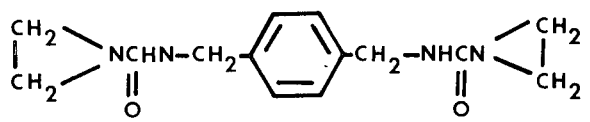

(para compound)

While the invention has been described in detail and in terms of specific embodiments thereof, it will be apparent to one skilled in the art that various changes and modifications can be made therein without departing from the spirit and scope thereof.

What is claimed is:

1. A process for polymerizing ω-lactams to high molecular weight polyamides by heating a mixture of at least one kind of ω-lactam, an anionic catalyst comprising the reaction product of a strong base and an ω-lactam, and an N-substituted ethyleneimine derivative of the general formula

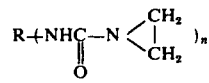

wherein n is 2 or 3 and R represents a divalent or trivalent organic group which has no active hydrogen with an activity higher than the hydrogen of >N—H of the lactam to be polymerized, said N-substituted ethyleneimine derivative being present in an amount of from about 0.01 to about 5.0 mol percent to the amount of said ω-lactam to be polymerized.

2. The process of claim 1 where R is divalent.
3. The process of claim 1 where R is trivalent.
4. The process of claim 1 where R is selected from the group consisting of:
   a. an alkylene group having 1 to 20 carbon atoms; and,
   b. an aromatic hydrocarbon group which may be interrupted by a heteroatom or a heteroatomic group.
5. The process of claim 1 where R is an alkylene group having 1 to 20 carbon atoms.
6. The process of claim 1 where R is an aromatic hydrocarbon group which may be interrupted by a heteroatom or a heteroatomic group.
7. The process of claim 6 where R is selected from the group consisting of a phenylene group, a diphenylene group, a tolylene group, a xylylene group, a naphthylene group, and a halogen substituted derivative thereof

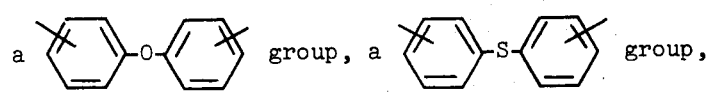

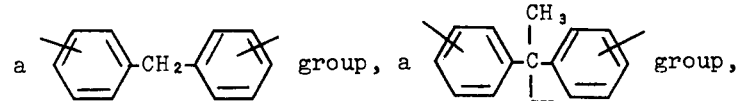

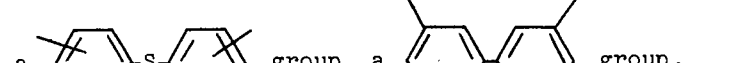

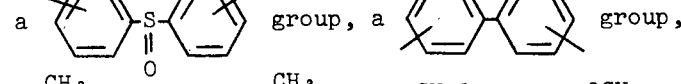

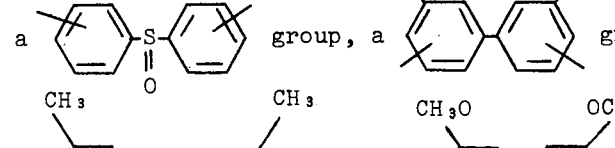

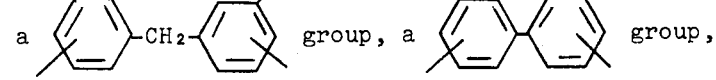

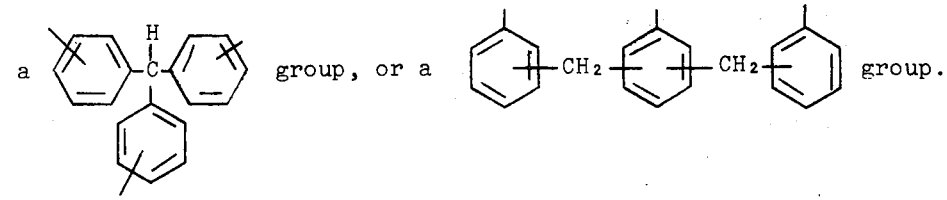

8. The process of claim 7 where R is selected from the group consisting of a phenylene group, a diphenylene group, a tolylene group, a xylylene group, a naphthylene group, and a halogen substituted derivative thereof.

9. The process of claim 7 where R is selected from the group consisting of

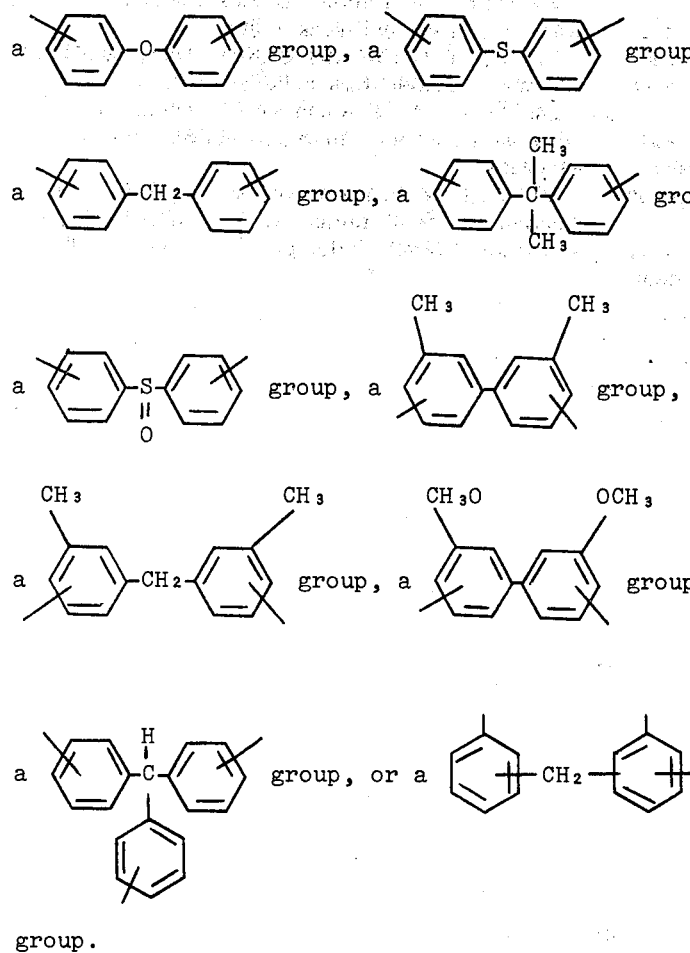

group.

10. The process of claim 1 where R is an alkylene group of 1 to 20 carbon atoms selected from the group consisting of an ethylene group, a tetramethylene group, a heptamethylene group, and a hexamethylene group, a

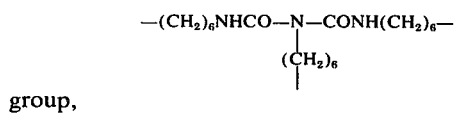

group, and a 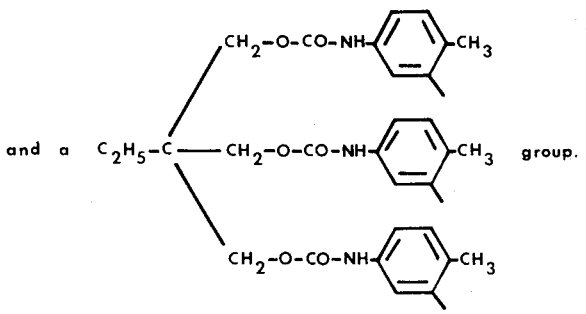 group.

11. The polymerization process as claimed in claim 1, wherein said N-substituted ethyleneimine derivative is diphenylmethane-4,4'-bis-ethylene urea.

12. The polymerization process as claimed in claim 1, wherein said N-substituted ethyleneimine derivative is N,N'-hexamethylene-bis-ethylene urea.

13. The polymerization process as claimed in claimed in claim 1, wherein said N-substituted ethyleneimine derivative is m-toluylene-bis-ethylene urea.

14. The polymerization process as claimed in claim 1, wherein said N-substituted ethyleneimine derivative is 3,3'-dimethyldiphenyl-4,4'-bis-ethylene urea.

15. The polymerization process as claimed in claim 1, wherein said N-substituted ethyleneimine derivative is present at a level of about 0.05 to about 1 mol percent to the amount of said ω-lactam to be polymerized.

16. The polymerization process as claimed in claim 1, wherein said strong base is an alkali metal, an alkaline earth metal, a strong-basic derivative of said alkali metal or said alkaline earth metal.

17. The polymerization process as claimed in claim 1, wherein said strong base of said reaction product is present at a level of about 0.05 to about 10 mol percent to the amount of said ω-lactam to be polymerized.

18. The polymerization process as claimed in claim 1, wherein said ω-lactam is pyrrolidone, piperidone, ε- caprolactam, ω-enantholactam, ω-caprylactam, ω-lauryllactam, ω-pelargonolactam, ω-decanolactam, or ω-undecanolactam.

19. The polymerization process as claimed in claim 1, wherein said heating is at temperatures of from about 25°C to about 200°C for about 0.5 to 200 minutes.

20. The polymerization process as claimed in claim 1, wherein said ω-lactam to be polymerized is ε-caprolactam and said heating is at temperatures of from about 120° to 140°C.

21. The polymerization process as claimed in claim 1, wherein said ω-lactam to be polymerized is ω-lauryllactam and said heating is at temperatures of from about 153° to 180°C.

22. The polymerization process as claimed in claim 1, wherein said ω-lactam to be polymerized is a mixture of ε-caprolactam and ω-lauryllactam and said heating is at temperatures of from about 120° to 180°C.

23. The polymerization process as claimed in claim 1, wherein said ω-lactam to be polymerized is pyrrolidone or piperidone and said heating is at temperatures of from about 30 to 60°C.

24. The polymerization process as claimed in claim 1, wherein said ω-lactam to be polymerized is ω-enantholactam, ωcapryliclactam, ωpelargonolactam, ω-decanolactam, or ω-undecanolactam and said heating is at temperatures of from about 160° to 180°C.

25. The polymerization process as claimed in claim 1, wherein said strong base is sodium hydride.

26. The polymerization process as claimed in claim 1, wherein said strong base is sodium.

27. The polymerization process as claimed in claim 1, wherein said strong base is lithium hydride.

28. The polymerization process as claimed in claim 1, wherein said ω-lactam to be polymerized is a mixture of ω-lactams.

29. The polymerization process as claimed in claim 1, wherein said N-substituted ethyleneimine derivative is a mixture of N-substituted ethyleneimine derivatives.

* * * * *

UNITED STATES PATENT AND TRADEMARK OFFICE
CERTIFICATE OF CORRECTION

PATENT NO. : 3,947,428
DATED : March 30, 1976
INVENTOR(S) : Tadao Matsuo et al

It is certified that error appears in the above-identified patent and that said Letters Patent are hereby corrected as shown below:

IN THE SPECIFICATION:

Col. 1, line 12, delete "ω-lactum" and insert therefor -- ω-lactam --;

line 14, delete "ω-lactum" and insert therefor -- ω-lactam --.

Col. 3, line 4, delete "xylyene" and insert therefor -- xylylene --.

IN THE CLAIMS:

Col. 16, lines 4-5, Claim 24, delete "ω-enatholactam" and insert therefor -- ω-enantholactam --.

Signed and Sealed this

Thirteenth Day of July 1976

[SEAL]

Attest:

RUTH C. MASON
Attesting Officer

C. MARSHALL DANN
Commissioner of Patents and Trademarks